3,417,678
BITUMINOUS RESINOUS COMPOSITIONS FOR CONSTRUCTION PURPOSES
Johannes W. Ewers, Hamburg, Germany, assignor to Shell Oil Company, New York, N.Y., a corporation of Delaware
No Drawing. Filed Jan. 21, 1965, Ser. No. 427,173
Claims priority, application Germany, Feb. 24, 1964, S 89,666
18 Claims. (Cl. 94—23)

ABSTRACT OF THE DISCLOSURE

Novel polyepoxide compositions containing bituminous materials are disclosed. These compositions comprise (1) a polyepoxide, (2) a naphthenic acid amide having at least three hydrogen atoms attached to amino nitrogen atoms and (3) a bitumen. Uses of the above-noted compositions, such as in the preparation of coatings and floor coverings, are also disclosed.

---

The invention relates to novel polyepoxide compositions containing bituminous materials which are particularly suitable as binders, floor coverings and protective coatings for other building materials.

Specifically, the invention provides new and particularly useful epoxy resin-bituminous compositions which can be cured to form products which have excellent heat and solvent resistance and improved flexibility. The compositions comprise a mixture of polyepoxide possessing more than one vic-epoxy group, and preferably a glycidyl polyether of a polyhydric phenol, a bituminous material, and an amide of an aliphatic polyamine and naphthenic acid or curing agent.

Various compositions have been suggested for the above purposes but these did not prove to be satisfactory in every respect. In many cases the known compositions do not possess the desired heat, wear and solvent resistance or they lack the necessary adhesion to concrete, asphalt and metal surfaces, particularly if the latter are in the least oily or dusty; in other cases the flexibility or the resistance to unfavorable weather conditions was insufficient.

It has now been found that flexible to hard compositions may be prepared from polyepoxides and bituminous materials such as asphaltic bitumen, lubricating oils or lubricating oil extracts rich in aromatics by using, as curing component for the polyepoxide, a naphthenic acid amide having at least three hydrogen atoms attached to amino nitrogen.

The naphthenic acid amides are prepared from naphthenic acids such as are obtained in the working up of mineral oil by neutralizing certain fractions with, for example, a caustic alkali solution or solid caustic alkali or calcium hydroxide. The higher molecular naphthenic acids from lubricating oil fractions are preferred. The naphthenic acids may be purified by distillation or by separation of the entrained portion of unsaponifiable neutral oil, but in general this is not necessary. The naphthenic acids are mixtures of various acid compounds, mainly saturated cyclopentane carboxylic acids having a terminal carboxyl group on a side chain. The naphthenic acids are reacted at elevated temperatures with aliphatic polyamines such as diethylene triamine, triethylene tetramine or higher polyethlene polyamines such as bottom products from the distillation in the process for the preparation of ethylene polyamines, preferably adding one mol of polyamine for an amount of naphthenic acid which corresponds to one acid equivalent. The reaction with polyamine may be carried out by boiling under reflux, with separation of the formed water, if desired in the presence of a solvent boiling above 130° C., such as xylene, and is generally continued until the equivalent amount of water is separated. Under these conditions the reaction is in most cases complete after a few hours. When preparing larger batches the dilution with solvents can in most cases be omitted.

The polyepoxides to be used in the preparation of the bituminous compositions are those compounds and mixtures which on an average contain more than one epoxy group in the molecule. Particularly preferred polyepoxides are polyglycidyl ethers of polyhydric phenols, such as polyglycidyl ethers of 2,2-bis(4-hydroxyphenyl) propane, bis(4 - hydroxyphenyl)methane, 1,1 - bis(4-hydroxyphenyl)ethane, resorcinol, novolacs, resols, 1,1,2,2-tetrakis (4-hydroxyphenyl)ethane, 1,1,5,5-tetrakis (4-hydroxyphenyl)pentane, as well as mixtures thereof. Particularly preferred are liquid polyglycidyl ethers of 2,2-bis(4-hydroxyphenyl)propane with molecular weights between 340 and 900.

Other preferred polyepoxides are polyglycidyl ethers of polyhydric alcohols, such as polyglycidyl ether of glycerol pentaerythritol, trimethylolpropane and 1,2,6-hexanetriol; these polyepoxides may also be employed in admixture with polyglycidyl ethers of polyhydric phenols.

Other preferred polyepoxides are mixtures of polyglycidyl ethers of polyhydric phenols and/or polyhydric alcohol with smaller amounts, for example, 3 to 20% by weight, of monoepoxides, such as phenylglycidyl ether, butyl glycidyl ether, 2-ethylhexyl glycidyl ether, glycidyl ester of dihydropyran-2-carboxylic acid and glycidyl esters of saturated alphatic monocarboxylic acids in which the carboxyl groups are attached to tertiary and/or quaternary carbon atoms.

Other suitable polyepoxides are polyepoxy esters, for example, polyglycidyl esters of dimerized and trimerized unsaturated fatty acids such as linoleic acid, soluble condensates from polymeric unsaturated fatty acids with more than 1.5 times of the equivalent amount of polyglycidyl ethers of polyhydric phenols, epoxidized cyclohexenyl methyl esters of cyclohexenyl carboxylic acids such as 3,4-epoxy-6-methylcyclohexyl methyl ester of 3,4-epoxy-6-methylcyclohexane carboxylic acid, epoxidized aliphatic and cyclic diolefins, epoxidized diolefin polymers and epoxidized copolymers of diolefins with mono-olefinically unsaturated compounds.

The bituminous materials used in the compositions according to the invention comprise substance such as coal tar, refined coal tar, petroleum asphalt, residual fuel oils, high-boiling petroleum extracts rich in aromatics and the like. Preferred bitumens are straight-run, blown, cracked, aromatic and catalytically or non-catalytically polymerized bitumens. Aromatic petroleum asphalts may be improved with respect to their flexibility by using the present invention, thus extending the possible uses of these products which are normally hard and brittle.

Straight-run asphalts which are used, for example, for paving purposes are greatly improved by the incorporation of the above-mentioned products. Normally straight-run asphalts particularly suitable for paving purposes have penetrations of between about 40 and about 300 and softening points within the range of from about 63° C. to about 85° C. Blown asphalts suitable for use in roofing may be improved with respect to their penetration and softening point relationships by using the present invention. Blown asphalts are normally produced in the presence or absence of catalysts by blowing asphalts at elevated temperatures with an oxygen-containing gas, such as air. A typical blown asphalt may have a softening point range of between about 116 and about 71° C. and a penetration of about 30 to about 5.

Other preferred materials include high-boiling petroleum extracts rich in aromatics, for example, those obtained by extracting petroleum distillates such as lubricating oil fractions with selective solvents for aromatic compounds. To obtain such extracts various non-reactive, highly polar, aromatically preferential solvents are used, such as liquid sulfur dioxide, phenol, cresol, furfural, sulfolane, beta, beta-dichloroethyl ether, nitro-benzene and the like. The use of the so-called double solvent process employing mutually immiscible solvents such as cresol and propane also gives suitable extracts. Especially preferred are the Edeleanu and furfural extracts of petroleum distillates, i.e., extracts obtained by using liquid sulfur dioxide or liquid sulfur dioxide in combination with benzene or extracts obtained with furfural. The extracts are high-boiling materials which range in general from viscous liquids to tar-like materials at ordinary temperatures. Extracts largely boiling above 300° C. at 760 mm. Hg are preferred.

Another preferred group of bituminous materials includes residual fuel oils, such as those having a viscosity of from 10 cs. at 38° C. to about 1500 cs. at 38° C.

The amount of naphthenic acid amides used in the composition according to the invention is related to the amount of polyepoxide. Preferably, from 0.8 to 4 equivalents of naphthenic acid amide for each epoxy equivalent of polyepoxide should be present; equivalent refers to the amount of naphthenic acid amide which contains one amino hydrogen atom for each epoxy group of polyepoxide. Part of the naphthenic acid amide, for example up to 50 equivalent percent, may be replaced by other amino group containing curing agents, for example, by a polyethylene polyamine such as diethylene triamine or by amino group-containing polyamides of polycarboxylic acids.

The total amount of neutral components in the compositions of the invention may be varied within wide limits. The total amount of neutral components is composed of the bitumen portion or lubricating oil extract rich in aromatics and the portion of unsaponifiable neutral oil of the naphthenic acid amide.

When a liquid polyglycidyl ether of 2,2-bis(4-hydroxyphenly)propane is used as polyepoxide the total amount of neutral components is preferably maintained below 37% by weight, based on the total amount of polyepoxide, naphthenic acid amide and bitumen, in order to attain the best possible results with respect to homogeneity and solvent resistance of the cured compositions.

In this connection it is of secondary importance of which components this neutral oil is composed; for example, if a naphthenic acid amide from purified naphthenic acid, i.e., naptenic acid with a low neutral oil content is used, the bitumen portion and/or extract portion of the mixture may be correspondingly increased instead. If in this case the curing process is followed under the microscope, it will be found that mixtures containing a total amount of neutral oil of less than 37%, will at best separate out fine oil droplets in a continuous resin phase; at a higher total content of neutral oil the separated material rapidly becomes coarser and at a total neutral oil content of about 50% a phase reversal is clearly perceptible; the asphalt oil components now separate out as a continuous phase.

The compositions according to the invention from the said three components cure very slowly at room temperature and thus have a very long pot-life. For practical use curing may be effected by applying heat, e.g., temperatures between 50° C. and 200° C. Binders which harden sufficiently quickly in the cold as well and may be worked up without applying heat are obtained by adding to the mixture minor amounts of other curing accelerators known per se. Suitable curing accelerators include triethanolamine, phenol, cresols, dimethylamino methylphenol and 2,4,6-tri(dimethyl-amino methyl) phenol.

To the compositions of the invention may be added mineral fillers such as sand, stone powder, shells, crushed quartz, corundum and the like.

For the preparation of coatings the compositions, with or without additives, are applied to the surface to be coated, if necessary rolled out and cured thereon to form a homogeneous coating layer. For the preparation of nonskid and wear-resistant coatings a composition may be applied to the surface in a thin layer and inert, finely divided materials, for example, sand or corundum, may subsequently be sprinkled on the coating before it has set. The compositions with or without filler excellently combine with building materials of another type, such as asphalt road surfaces, concrete, wood, iron and stone. With asphalt road surfaces they form a completely homogeneous bond and give protective layers which do not come off under mechanical stress.

The compositions according to the invention are particularly suitable as binders for mineral mixtures to form coatings or coverings for runway surfaces, roads, storage places or the like. However, they may also advantageously be used without mineral admixture as elastic layers for floors, staircases and the like. They are particularly suitable as coatings for floors, road surfaces or building materials of another type to protect these against spilled chemicals or solvents such as, for example, gasoline or diesel fuel and to prevent these solvents from penetrating therein. By certain variations in the formulation the compositions according to the invention may be adapted to the various uses. Compositions with a relatively large portion of polyepoxide are harder and more brittle, but at the same time highly resistant to chemicals and many solvents. Compositions with a low polyepoxide content show a more rubberlike flexibility and on account of their consistency are very suitable as binders for nonskid floor coverings. Further, the consistency, also before curing, may be influenced by the composition of the oil-bitumen components. Moreover, the consistency of the mixture before curing may, of course, be adapted to the working up process by selecting a polyepoxide with a higher or lower viscosity. On the other hand, for the consistency of the cured composition it is only of secondary importance whether curing is effected by applying heat or with the aid of curing accelerators in the cold.

The invention will now be illustrated by some examples. Unless otherwise stated, parts are parts by weight. The naphthenic acid amide used in the examples had been prepared from a technical- naphthenic acid obtained in the working up of petroleum. The naphthenic acid had the following characteristics:

Neutralization value _____mg. KOH/g__ 83
Saponification value _____mg. KOH/g__ 95
Saponification portion _____percent by weight__ 75
Neutralization value of the saponifiable
  portion _____ mg. KOH/g____ 150
Molecular weight of the saponifiable portion _____ 373

The naphthenic acid was dissolved in xylene and mixed with one mol of diethylene triamine per acid equivalent of naphthenic acid. The mixture was boiled under reflux for 3–4 hours, after which the equivalent amount of water had separated out. The xylene was subsequently removed by distillation.

Example I

The naphthenic acid amide prepared as in the above-described manner was worked up with a polyepoxide prepared from epichlorohydrin and diphenylolpropane and having a viscosity of 100–150 p./25° C. and with petroleum asphalt having a softening point (ring and ball) of 46° (standard bitumen B80), in the following ratio:

| | Percent by weight |
|---|---|
| Glycidyl polyether of 2,2-bis(4-hydroxyphenyl) propane | 34.8 |
| Naphthenic acid amide | 45.2 |
| Asphalt | 20.0 |

At room temperature this mixture cured only very slowly and thus had a very considerable pot-life; it was highly viscous and was heated to about 60° C. for the working up. At 120° C. the mixture cured in two hours.

Example II

Using the same starting materials as in Example I, a mixture of the following composition was prepared:

| | Percent by weight |
|---|---|
| Glycidyl polyether of 2,2-bis(4-hydroxyphenyl) propane | 28.4 |
| Naphthenic acid amide | 55.3 |
| Asphalt | 16.3 |

This mixture, too, had a considerable pot-life at room temperature; at 120° C. it cured in two hours.

Example III

Foils with a thickness of 3 to 4 mm. (cured at 120° C.) were prepared from the mixtures according to Example I and discs with a diameter of 30 mm. made from these oils were kept in solvents for 24 hours at room temperature. After this time the swelling was determined by measuring the discs and the loss of weight by careful evaporation of the solvent.

| | Composition according to Example I, percent by weight |
|---|---|
| Benzene, solubility | 41 |
| FAM-gasoline: | |
| Solubility | 2 |
| Swelling | 6 |

Example IV

The naphthenic acid amide described above was mixed with the polyepoxide according to Example I, after admixture, however, with such an amount of butylglycidyl ether that the viscosity was reduced to 7.11 p./25° C. (10% by weight), then with a cutback asphalt from two parts of petroleum asphalt having a softening point (ring and ball) of about 32° C. (standard bitumen B300) and one part of SO₂ extract from heavy spindle oil, and finally with small amounts of diethylenetriamine and technical cresol as curing accelerator, in the following ratio:

| | Percent by weight |
|---|---|
| Glycidyl polyether of 2,2-bis(4-hydroxyphenyl) propane | 33.4 |
| Naphthenic acid amide | 43.5 |
| Cutback asphalt | 19.4 |
| Diethylenetriamine | 1.7 |
| Cresol | 2.0 |

This mixture was workable about 2 hours and cured completely in about 24 hours at room temperature. Its solubility after hardening in FAM-gasoline was about 8.8% by weight.

Example V

From the same polyepoxide and naphthenic acid amide as used in the previous example and from the SO₂-extract from heavy spindle oil the following mixture was composed:

| | Percent by weight |
|---|---|
| Glycidyl polyether of 2,2-bis(4-hydroxyphenyl) propane | 26 |
| Naphthenic acid amide | 28 |
| SO₂-extract | 35 |
| Diethylenetriamine | 1 |
| Cresol | 10 |

Up to two hours after mixing by stirring this mixture was still workable, also by spraying; it cured in 24 hours at room temperature to such an extent that a plastered stone floor covered with this mixture could be walked on.

Example VI

A suitable material for gasoline and chemical resistant floor coverings was prepared from 88% by weight of sand and 12% by weight of the same mixture as used in Example V. The sand was composed in accordance with the filler curve.

| Mm.: | Percent by weight |
|---|---|
| 2.0–0.6 | 45 |
| 0.6–0.2 | 23 |
| 0.2–0.09 | 11 |
| Below 0.09 | 21 |

The material had a porosity of 5% by volume. After complete curing cubes were cut from this material and kept in various solvents and chemicals for 7 days. After this period only the solvents, acetone, methylethylketone, benzene, xylene and carbon tetrachloride had softened the material and caused it to disintegrate; isopropyl alcohol only softened the edges, gasoline produced only superficial softening and lubricating oil no change at all. Since in practice these materials only stay on the covering material for at most a few hours and are then evaporated, such a floor covering is completely resistant to gasoline and oils and sufficiently resistant to such pronounced solvents as aromatic hydrocarbons. Sulfuric acid (5% and 50% concentration) only caused discoloration and a very minor degree of softening, hydrochloric acid (5% and 15% concentration) a slightly stronger superficial softening, nitric acid caused discoloration but no softening and a caustic soda solution (5% and 20% concentration) again a minor softening with a slight discoloration. As spilled chemicals do not stay on the material for weeks on end either, such a floor covering may therefore be regarded as practically insensitive to most chemicals.

Example VII

A 2 mm. thick layer of a mixture consisting of 50% by weight of mineral filler and 50% by weight of a composition as described in Example V was applied to an ordinary bitumen bound road surface. After the road surface had hardened and been cut open this layer could no longer be separated or taken off any more. Samples formed from this road surface material and covered with the said protective layer were kept in gasoline, diesel fuel and lubricating oils for 36 hours. After this time their resistance to pressure was not at all diminished, whereas the majority of similar samples not having a protective layer had already disintegrated during this storage.

I claim as my invention:

1. A bituminous composition for construction purposes, consisting essentially of a mixture of
    (a) a polyepoxide having on an average more than one epoxy group per molecule,
    (b) from 0.8 to 4 equivalent per epoxy equivalent of said polyepoxide of a naphthenic acid amide having at least three hydrogen atoms attached to amino nitrogen atoms, said amide being the reaction product of a naphthenic acid extracted from the lubricating oil fraction of a mineral oil, with an aliphatic polyamine as well as
    (c) a bitumen.

2. A composition as claimed in claim 1 wherein the amide is an amide of naphthenic acids and diethylenetriamine.

3. A composition as claimed in claim 1 wherein the bitumen is straight-run asphalt.

4. A composition as claimed in claim 1 wherein the bitumen is a blown asphalt.

5. A composition as claimed in claim 1 wherein the bitumen is a high-boiling petroleum extract rich in aromatics.

6. A composition as claimed in claim 1 wherein the polyepoxide is a polyglycidyl ether of a polyhydric alcohol.

7. A composition as claimed in claim 1 wherein the polyepoxide is a polyglycidyl ether of a polyhydric phenol.

8. A composition as in claim 1 wherein the polyepoxide is a polyglycidyl ether of 2,2-bis(4-hydroxyphenyl)propane having a molecular weight between 340 and 900.

9. A composition as in claim 1 wherein the mixture also contains a liquid monoepoxide.

10. A composition as in claim 1 wherein the mixture also contains an aliphatic polyamine.

11. A composition as in claim 1 wherein the mixture also contains a phenol.

12. A composition as in claim 1 wherein the mixture also contains a mineral filler.

13. A process for the preparation of a coating comprising applying a composition as defined in claim 1 to the surface to be coated and allowing the mixture to cure.

14. A process for the preparation of an improved road and runway covering comprising applying a composition as in claim 1 to the surface to be coated and allowing the mixture to cure.

15. A process as in claim 14 wherein finely divided minerals are sprinkled on the coating before curing.

16. A process as in claim 14 wherein the surface to be coated is cement.

17. A process as in claim 14 wherein the surface to be coated is an asphalt surface.

18. A composition as in claim 1 wherein the amount of the bitumen varies from about 2% to 37% by weight of the combined weight of polyepoxide, napthenic acid amide and bitumen.

References Cited

UNITED STATES PATENTS

| | | | |
|---|---|---|---|
| 2,760,944 | 8/1956 | Greenlee | 260—47 |
| 2,906,720 | 9/1959 | Simpson | 260—28 |
| 3,156,660 | 11/1964 | Scheibli | 260—28 |

MORRIS LIEBMAN, *Primary Examiner.*

B. A. AMERNICK, *Assistant Examiner.*

U.S. Cl. X.R.

117—32, 123, 161, 168; 260—28, 37, 47